(12) United States Patent
Bessonov et al.

(10) Patent No.: US 7,823,210 B2
(45) Date of Patent: Oct. 26, 2010

(54) RIGHTS MANAGEMENT USING RECORDING DEFINITION INFORMATION (RDI)

(75) Inventors: Alexander Bessonov, San Jose, CA (US); John H. Grossman, IV, Fremont, CA (US)

(73) Assignee: Microsoft Corporation, Redmond, WA (US)

( * ) Notice: Subject to any disclaimer, the term of this patent is extended or adjusted under 35 U.S.C. 154(b) by 926 days.

(21) Appl. No.: 11/419,981

(22) Filed: May 23, 2006

(65) Prior Publication Data
US 2007/0277234 A1 Nov. 29, 2007

(51) Int. Cl.
G06F 7/04 (2006.01)
G06F 17/30 (2006.01)
G06F 15/16 (2006.01)
G06F 13/00 (2006.01)
G06F 21/00 (2006.01)
H04L 29/06 (2006.01)
H04N 7/16 (2006.01)

(52) U.S. Cl. .................... 726/27; 726/2; 726/3; 726/4; 726/7; 726/10; 726/16; 726/17; 726/19; 726/21; 726/26; 726/28; 726/29; 726/30; 726/31; 726/32; 726/33; 713/182; 713/185; 709/246

(58) Field of Classification Search ............... 726/2–10, 726/26–30, 16–21; 380/278; 713/150, 167, 713/168, 176, 189, 193, 182–186; 705/50, 705/51; 709/203, 277–279, 246
See application file for complete search history.

(56) References Cited

U.S. PATENT DOCUMENTS

| | | | |
|---|---|---|---|
| 6,006,332 A | 12/1999 | Rabne et al. | |
| 6,088,805 A * | 7/2000 | Davis et al. | 726/10 |
| 6,513,117 B2 | 1/2003 | Tarpenning et al. | |
| 6,668,246 B1 | 12/2003 | Yeung et al. | |
| 6,775,655 B1 | 8/2004 | Peinado et al. | |
| 7,017,189 B1 | 3/2006 | DeMello et al. | |
| 2002/0138362 A1* | 9/2002 | Kitze et al. | 705/26 |
| 2004/0128499 A1 | 7/2004 | Peterka et al. | |
| 2005/0010531 A1* | 1/2005 | Kushalnagar et al. | 705/59 |

(Continued)

OTHER PUBLICATIONS

Park et al., "A PKI Based Digital Rights Management System for Safe Playback," Springer Berlin online publication description, available at <<http://www.springerlink.com/(3q3jlkrxjy3iev45r5u2tdyw)/app/home/contribution.asp?referrer=parent&backto=issue,83,103; journal,309,3833;lin kingpublicationresults,1:105633,1>>, printed on May 23, 2006, 1 page.

(Continued)

*Primary Examiner*—Taghi T Arani
*Assistant Examiner*—Madhuri Herzog
(74) *Attorney, Agent, or Firm*—Lee & Hayes, PLLC (57) ABSTRACT

A rights management system is described in which, subsequent to recording a media resource, client-side equipment receives and stores recording definition information (RDI). The RDI provides information that can be used to recover the keys used to decrypt the media resource. When a client device subsequently wishes to consume the media resource, it can forward the RDI to an operations center. At the operations center, a transcription module validates the client device's rights and converts the RDI into client targeted information (CTI) by recovering the keys used to decrypt the media resource. The client device receives the CTI from the transcription module and uses it to consume the media resource. The CTI has an expiration date, after which it can no longer be used.

18 Claims, 9 Drawing Sheets

U.S. PATENT DOCUMENTS

| | | | |
|---|---|---|---|
| 2005/0065891 A1 | 3/2005 | Lee et al. | |
| 2005/0071274 A1 | 3/2005 | Pfaff et al. | |
| 2005/0081042 A1* | 4/2005 | Venkatesan et al. | 713/176 |
| 2005/0177740 A1* | 8/2005 | Athaide et al. | 713/189 |
| 2005/0216763 A1* | 9/2005 | Lee et al. | 713/200 |
| 2005/0267994 A1* | 12/2005 | Wong et al. | 709/246 |
| 2006/0026691 A1 | 2/2006 | Kim et al. | |
| 2006/0050701 A1 | 3/2006 | Peterka et al. | |
| 2006/0059106 A1 | 3/2006 | Chase et al. | |

OTHER PUBLICATIONS

DivX Digital Rights Management (DRM), available at <<http://www.divx.com/company/partner/drm.php>>, printed on May 21, 2006, 1 page.

Eskicioglu et al. "New Channels for Carrying Copyright and Usage Rights Data in Digital Multimedia Distribution", IEEE 2003, available at <<http://www.sci.brooklyn.cuny.edu/~eskicioglu/papers/ITRE2003.pdf>>, pp. 94-98.

Microsoft Windows Media, "Benefits of Windows Media DRM," available at <<http://www.microsoft.com/windows/windowsmedia/forpros/drm/benefits.aspx>>, printed May 21, 2006, 2 pages.

Microsoft Windows Media, "Features of Windows Media DRM," available at <<http://www.microsoft.com/windows/windowsmedia/forpros/drm/features.aspx>>, printed May 21, 2006, 3 pages.

Utahara, Takashi, "Short-delay playback and high reliability content delivery through chain-casting," Communications, 2003, APCC 2003, Sep. 2003, vol. 2, pp. 802-805.

Wikipedia, the free encyclopedia, "Digital Rights Management," available at <<http://en.wikipedia.org/wiki/Digital_rights_management>>, printed May 21, 2006, pp. 1-14.

* cited by examiner

RIGHTS MANAGEMENT USING RECORDING DEFINITION INFORMATION (RDI)

BACKGROUND

Rights management is commonly performed to restrict the consumption of media resources by users. Such media resources can include video programs, music, and so forth. In one basic approach, a client device obtains a license from a rights management web service as a precondition to consuming a particular media resource. The license includes one or more keys that can be used by the client device to decrypt the media resource.

While the basic model described above has proven viable, it does not fully address scenarios of increasing complexity in which users may now consume media resources. Consider the case, for instance, in which a user records a television program using a digital video recorder (DVR). As appreciated by the present inventors, one variant of the above-described strategy is to give the users keys to consume this program for an unlimited amount of time on any available client device. As appreciated by the present inventors, this approach is not fully satisfactory because it does not provide is adequate safeguards to prevent the unauthorized distribution and consumption of the resource.

For at least the above-stated exemplary and non-limiting reasons, there is a need for more effective techniques for administering rights used to govern the consumption of resources.

SUMMARY

The following description sets forth a right management system for governing the consumption of resources by client devices. In one exemplary and non-limiting application, the resources comprise audio-visual (AV) media resources. In this application, the client devices may be associated with a digital video recorder (DVR) which stores the media resources for later consumption by one or more client devices.

In one implementation, the rights management system includes an operations center that includes a recording definition information (RDI) issuing module and a transcription module. In operation, the RDI-issuing module generates recording definition information (RDI) and forwards the RDI to client-side equipment for storage. For instance, in a DVR implementation, after the DVR has finished recording a resource, it contacts the RDI-issuing module to receive an RDI corresponding to the recorded resource. The RDI provides information that can be used to recover the keys used to decrypt the resource.

When a client device subsequently wishes to consume the resource, it can forward the RDI to the transcription module. The transcription module validates the rights of the client device to receive the resource with reference to one or more rights management policies. The transcription module then converts the RDI into client targeted information (CTI) by recovering the keys used to decrypt the resource. The transcription module then forwards the CTI to the client device, allowing the client device to consume the media resource using the CTI. The CTI has an expiration date. When the expiration date is reached, the client device can no longer use the CTI to consume the media resource.

In one exemplary implementation, prior to receiving the RDI, the operations center does not store the keys that can be used to consume the resource at the client device. Instead, as set forth above, the operations center relies on the RDI to recover the keys. One advantage of this approach is that the operations center need not perform the potentially resource-intensive task of storing and managing keys. Thus, the above-described approach does not suffer from scalability problems. (Such scalability problems might be particularly pernicious in a streaming media environment in which the user is free to record any content that is being streamed in live fashion over any one of multiple virtual channels. That is, this kind of environment potentially requires the protection of a very large number of resources.)

According to another advantage, the above-described RDI-based protocol is separable from the rights management policies that govern the validation of client devices' rights to receive the keys. This aspect of the system allows a content provider or other entity to efficiently provide polices that are tailored to different groups of client devices without unduly complicating the administration of rights. This approach also allows a content provider or other entity to more readily change policies without requiring complex reengineering of the rights management system.

According to another advantage, any asymmetric aspect of rights management can be allocated to the operations center, instead of the client devices. This allows asymmetric processing to be performed more quickly.

The Summary section refers to exemplary and non-limiting manifestations of the subject matter described herein, and hence does not limit the scope of the invention set forth in the Claims section.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth functionality for administering rights of client devices to consume resources. The term resources has broad connotation. In one exemplary application, the resources may pertain to audio-visual (AV) media resources, such as video programs, music, games, and so forth.

This disclosure includes the following sections. Section A sets forth an exemplary rights management system for administering rights of client devices to consume resources. Section B sets forth exemplary procedures that explain the operation of the system of Section A.

A. Exemplary System (FIGS. 1-4)

Generally, any of the functions described with reference to the figures can be implemented using software, hardware (e.g., fixed logic circuitry), manual processing, or a combination of these implementations. The term "logic," "module" or "functionality" as used herein generally represents software, hardware, or a combination of software and hardware that is configured to perform prescribed tasks. For instance, in the case of a software implementation, the term "logic," "module," or "functionality" represents program code (and/or declarative-type instructions) that performs prescribed tasks when executed on a processing device or devices (e.g., CPU or CPUs). The program code can be stored in one or more computer readable memory devices.

More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

The terms "machine-readable media" or the like refers to any land of medium for retaining information in any form, including various kinds of storage devices (magnetic, optical, static, etc.).

A.1. Overview of One Exemplary System (FIG. 1)

Figure 1:
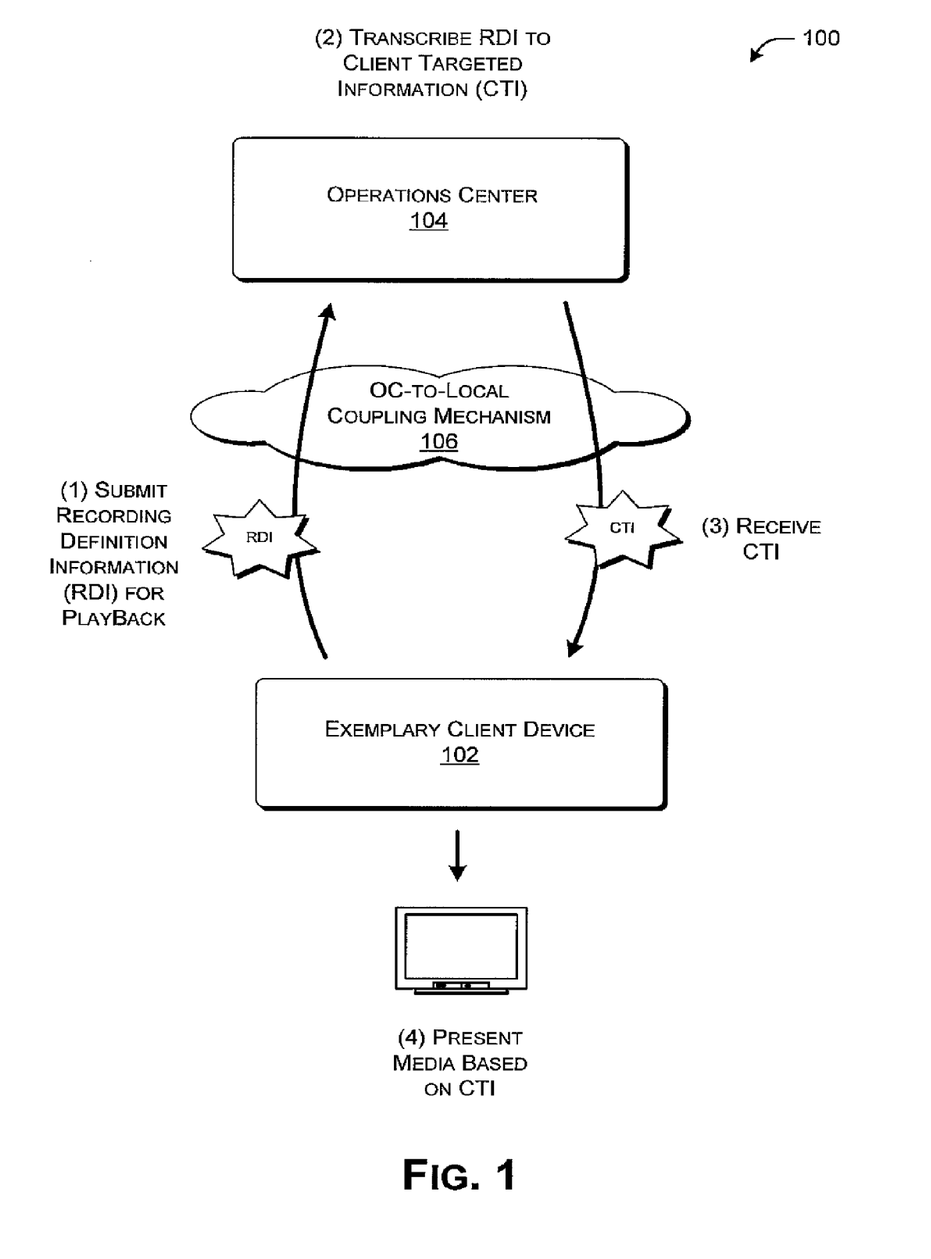
FIG. 1 shows an overview of a system for administering rights to consume resources by a plurality of client devices.

FIG. 1 provides an overview of a rights management system 100 that can be used to govern the consumption of resources by one or more client devices, such as exemplary client device 102. As mentioned above, the term resource can comprise any kind of consumable asset. In the case most commonly evoked in this discussion, the resource 2 comprises some kind of AV media resource, such as video programs, music, games, and so forth.

The system includes an operations center 104 for interacting with the client device 102 via a coupling mechanism 106. The operations center 104 can handle various server-side aspects of the system. For instance, the operations center 104 can forward the resources to the client device 102. The operations center 104 can also administer the rights of the client device 102 to consume the resources. In terms of physical implementation, the operations center 104 can be built from one or more server-type Computers, implemented by at a single site or distributed over plural sites, and controlled by a single entity or multiple entities.

The client device 102 can comprise any kind of processing device for receiving and presenting the resource. In one case, the client device 102 can comprise any kind of general purpose computer (such as a personal computer), any kind of portable computer device (such as a personal digital assistant device), any kind of set-top box, any kind of portable media player device, any kind of mobile telephone device, and so on. As will be explained with reference to later figures, the client device 102 can incorporate or can otherwise interact with a device for recording the resource, such as a digital video recorder (DVR) device (also known as a personal video recorder), a rewritable digital video disc DVD-RW) device, and so on.

The coupling mechanism 106 can be implemented in different ways to suit different technical and commercial environments. For instance, the coupling mechanism 106 can include any kind of network (or combination of networks), such as a wide area network (e.g., the Internet), an intranet, Digital Subscriber Line (DSL) network infrastructure, point-to-point coupling infrastructure, and so on. The coupling mechanism 106 can use or involve any kind of protocol or combination of protocols. In the case in which one or more digital networks are used to disseminate information, the coupling mechanism 106 can include various hardwired and/or wireless links, routers, gateways, name servers, and so on. In the case where DSL infrastructure is used to disseminate information, the coupling mechanism 106 can utilize the services, in part, of telephone coupling infrastructure and DSL processing functionality.

FIG. 1 also presents an overview of a basic flow of rights management information between the client device 102 and the operations center 104. Namely, FIG. 1 shows four operations, labeled as operation (1), (2), (3), and (4). Later figures illustrate these operations in greater detail in the context of a more concrete system environment.

Operation (1). In a first operation, the client device 102 initiates an instruction to consume a resource. In this step, it assumed that the client device 102 or other client-side equipment that is affiliated with the client device 102 has received the resource. It is further assumed that the client device 102 has received so-called record definition information (RDI). As described below, the RDI contains key information which can be transcribed by the operations center 104 to recover keys used to decrypt the resource. In the first operation, the client device 102 forwards the RDI to the operations center 104.

Operation (2). In a second operation, the operations center 104 validates the rights of the client device 102 to consume the resource. This decision can be made with reference to one or more rights management policies. If it is determined that the client device 102 is authorized to consume the resource, then the operations center 104 transcribes the RDI to so-called client targeted information (CTI). Transcription comprises processing key information in the RDI to produce keys that can be used by the client device 102 to decrypt the resource.

Operation (3). In a third operation, the operations center 104 forwards the CTI to the client device 102, where it can be stored by the client device 102 or some other client-side equipment.

Operation (4). In a fourth operation, the client device 102 uses keys in the CTI to decrypt and present the resource to a user. The CTI includes expiration information. This means that the client device is disabled from using the CTI to consume the resource after the expiration date.

FIG. 1 is also a useful vehicle to illustrate one of the exemplary advantages of the system 100. Namely, as described above, the operations center 104 performs a role in validating the rights of the client device 102 to consume a resource, and for recovering the keys used to decrypt the resource. But the operations center 104 need not actually store the keys. Rather, the RDI contains key information that can be used to recover the keys, and the RDI is stored locally by the client device 102. This reduces the storage needs and processing overhead which would otherwise be needed to administer a server-side rights-tracking program. At the same time, the client device 102 is prohibited from extracting the keys from the RDI without the assistance of the operations center 104, thereby preventing an unscrupulous user from using or propagating the keys in an unauthorized manner.

Other features and advantages of the system 100 will be set forth below.

A.2. Application of System to Multi-Client DVR Environment (FIG. 2)

The system 100 shown in FIG. 1 can be applied in many different environments. FIG. 2 shows the application of the system 100 to a rights management system 200 in which one or more client devices can receive and consume digital streams of media resources. Further, the client devices can record media resources using DVR technology for later playback.

Figure 2:
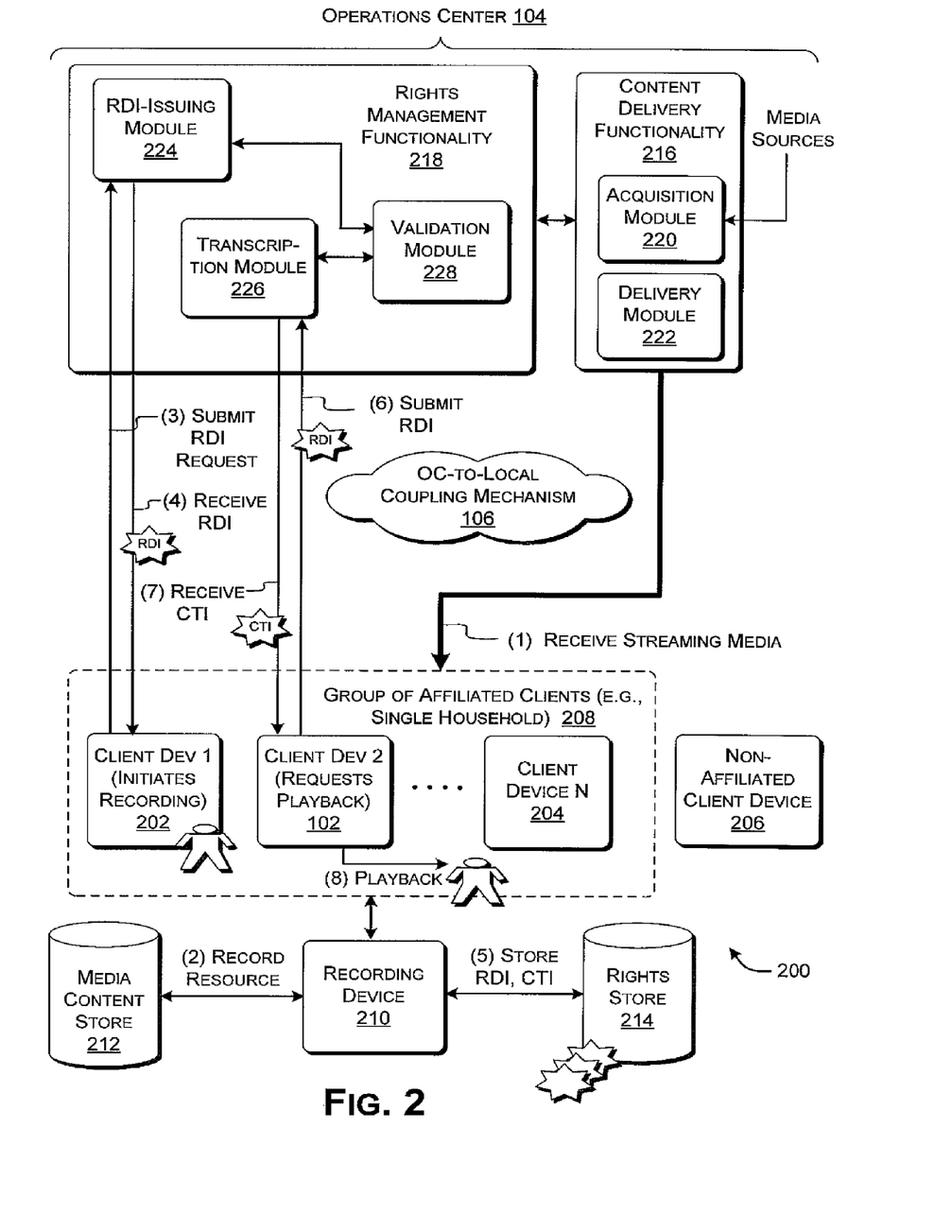
FIG. 2 shows one application of the system of FIG. 1 to a streaming media environment that employs a digital video recorder (DVR).

More specifically, the client device 102 of FIG. 2 may be one of many client devices (102, 202, 204, 206). Each of these client devices (102, 202, 204, 206) can be implemented in the manner described above, e.g., as any kind of general purpose computer (such as a personal computer), any kind of portable computer device (such as a personal digital assistant device), any kind of set-top box, any kind of portable media player device, any kind of mobile telephone device, and so on. Different groups of client devices can be affiliated with each other. For example, in the illustrative example of FIG. 2, client devices (102, 202, 204) are members of a group 208. For instance, this group 208 may define client devices (102, 202, 204) that are located within a single household. The client device 206 is not affiliated with the group 208. As will be described above, is one or more rights management policies may apply en bloc to members of a single group.

Any one or more of the client devices (102, 202, 204, 206) can incorporate or otherwise interact with a recording device 210. The recording device 210 can comprise a digital video recorder (DVR) device (also known as a personal video recorder, or PVR), a rewritable digital video disc DVD-RW) device, and so on. The recording device 210 can store resources that it has recorded in a media content store 212. Further, the recording device 210 (or some other client-side equipment) can store RDIs and CTIs that it receives from the operation center 104 in a rights store 214.

Turning now to the operations center-side of the system 200, the operations center can include content delivery functionality 216 and rights management functionality 218. The role of the content delivery functionality 216 is to acquire and forward resources to the client devices (102, 202, 204, 206) via the coupling mechanism 106. The role of the rights management functionality 218 is to govern the rights of the client devices (102, 202, 204, 206) to consume the resources forwarded by the content delivery functionality 216. The content delivery functionality 216 and rights management functionality 218 can 8 be administered by the same entity or different respective entities. Each of these functionalities (216, 218) will be described in greater detail as follows.

The content delivery functionality 216 includes an acquisition module 220 for supplying the programs from one or more sources of such information. The sources can represent any kind of entity which produces or provides media information, such as cable or satellite television providers, one or more Video-On-Demand (VOD) providers, one or more publishing houses of information, one or more library sources, any kind of Internet-enabled repository, and so on. The acquisition module 220 can also perform various preliminary processing tasks on the resources received from the sources, such as converting the resources into a consistent format. The acquisition module 220 can also associate keys with the resources that can be used to decrypt the AV content of the resources. To distinguish these kinds of keys from other types of keys mentioned below, these types of keys are referred to as AV keys. In terms of physical implementation, the acquisition module 220 can comprise one or more server computers or other functionality dedicated to the task of retrieving and performing preliminary processing on the resources.

The content delivery functionality 216 also includes a delivery module 222. The role of the delivery module 222 is to receive the resources from the acquisition module 222 and forward the resources to the client devices (102, 202, 204, 206) via the coupling mechanism 106. In one exemplary case, the delivery module 222 can forward the resources in streaming fashion. In this kind of environment, the delivery module 222 can be implemented as one or more delivery-type servers. One specific implementation of delivery-type servers is described in copending and commonly assigned U.S. patent application Ser. No. 10/010,200, entitled, "ACCELERATED CHANNEL CHANGE IN RATE-LIMITED ENVIRONMENTS," naming the inventors of Geoffrey R. Smith et al., a filed on Dec. 10, 2004. Clients can receive such resources supplied by the delivery module 222 by "tuning" to one or more virtual channels in a manner described more fully, for instance, in copending and commonly assigned U.S. patent application Ser. No. 11/057,477, entitled, "TUNERLESS MEDIA PRESENTATION UNIT AND METHODS OF USE," naming the inventors of David L. de Heer et al., filed on Feb. 14, 2005.

The resource forwarded by the content delivery functionality 216 is protected so that it cannot be accessed in an unauthorized client device. More specifically, the forwarded resource includes AV content. The AV content can be encrypted by one or more AV keys. Key IDs are used to associate the AV keys with corresponding parts of the resource that the keys are used to protect. The AV keys, in turn, may be encrypted by one or more pre-established session keys.

According to one exemplary implementation, a client device can establish authorization to consume content delivered by the content delivery functionality 216 in an initial negotiation procedure with the operations center 104. During this procedure, the client device can establish session key information. In one exemplary implementation, the system 200 is configured to renew the session key information on a periodic basis, such as every eight hours. The client device can receive the AV keys (for live consumption of media content) via a polling mechanism during the consumption of the media content. The client can receive AV keys for video-on-demand (VOD) content by making a service call to the operations center 104. The content delivery functionality 216 can optionally transmit the media content of the resource in a separate path than the AV keys.

In the circumstances featured in this description, the client device may record a resource for later playback. In this scenario, the AV keys can be provided according to the RDI protocol described at length below. It should be noted, however, that there may be hybrid cases, such as where a client device presents a resource in live mode as it is received, while simultaneously recording it for later playback. In these cases, the client device may rely on AV keys that are received by a polling mechanism to consume the media content in live mode, but upon later playback, the client device relies on the RDI protocol to be described.

The rights management functionality 218 can include an RDI-issuing module 224. As the name suggests, the role of the RDI-issuing module 224 is to issue recording definition information (RDI). In one case, the RDI-issuing module 224 generates the RDI when it receives an RDI request from one of the client devices (102, 202, 204, 206). As will be described below, a client device (102, 202, 204, 206) may generate such a request after the recording device 210 has just finished recording a resource received from the content delivery functionality 216.

The rights management functionality 218 also includes a transcription module 226. The role of the transcription module 226 is to transcribe a received RDI (which has been previously generated by the RDI-issuing module 224) to client-targeted information (CTI). As the name suggests, the client-targeted information (CTI) includes recovered keys that enable a specific (i.e., "targeted") client device (102, 202, 204, 206) to decrypt a resource received from the content delivery functionality 216. As will be described below, a client device (102, 202, 204, 206) may generate such a request for transcription when it wants to play back the resource that has been previously recorded by the recording device 210.

The rights management functionality 218 may also include a validation module 228. The purpose of the validation module 228 is to determine whether a particular client device that requests the playback of a resource is entitled to consume this resource. The validation module 228 can make this determination with reference to one or more policies. The policies set forth rules that define the entities that may receive particular resources, the conditions under which the entities may receive the resources, and so on. For example, a certain policy may specify that any member of the group 208 of household client devices (102, 202, 204) can play back a recording that was initiated by any other member of the group 208. Another policy may specify that any member of a friends-related group (not illustrated) can play back a recording that was initiating by any other member of the group, providing that a small fee is paid, and so on. As can be appreciated, a large number of policies can be used to govern the operation of the rights management functionality 218; the specific examples described herein are merely representative. In general, client devices may be associated with particular accounts. Particular policies may apply to respective accounts. For instance, an RDI may be associated with an account X; a policy may specify that this RDI cannot be used to play back the resource by client devices associated with an account Y.

In a first implementation, the validation module 228 can store the policies that are used to validate the rights of the client devices (102, 202, 204, 206) in a server-side database. In a second implementation, the RDI-issuing module 224 can embed information regarding one or more policies that apply to the consumption of a resource in a RDI that is sent to a client device (e.g., in a rights management field of the RDI, to be described below). The transaction module 226 can recover this policy information from the RDI itself without having to maintain policy information at the operations center 104. A third implementation can combine aspects of the first and second solutions, such that some of the policy information is extracted from the RDI and some of the policy information is obtained from the server-side database.

Finally, the coupling mechanism 106 itself can be implemented in any way mentioned above in the context of the discussion of FIG. 1.

Having set forth an overview of the structural components of the system 200, its exemplary manner of operation will be described below. As in the case of FIG. 1, exemplary operations performed by the system 200 are demarcated by reference numbers placed in parentheses.

Operation (1). In a first operation, one of the client devices, for instance client device 202, initiates a recording transaction by requesting and then receiving a resource from the content delivery functionality 216. This operation may include issuing an instruction to record a specified program on a specified virtual channel. Or this operation may include issuing an instruction to record a video-on-demand (VOD) program, and so on. In general, the resource may correspond to a discrete resource that is part of a library of discrete selectable resources. Or the resource may correspond to an arbitrarily selectable segment of a stream of live resource information that is forwarded to the client device 202 by the content delivery functionality 216, and so on. In response to a request to receive the resource, the client device can receive the AV content corresponding to the resource, as well as key information (e.g., AV keys and key IDs). The key information allows the client device, if authorized, to consume the resource in live mode. However, this key information received with the AV content does not give the client the ability to consume the resource at a later time (e.g., after it has been recorded). To enable later playback, the system 200 relies on the RDI protocol.

Operation (2). In a second operation, the client device 202 can interact with the recording device 210 to store the resource in the media content store 212. Upon receipt of the resource, the client device 202 is not yet able to decrypt and consume the stored resource.

Operation (3). In a third operation, after the recording device 210 has stored the resource, the client device 202 which initiated the recording (or another entity) can send an RDI request to the RDI-Issuing module 224. As the name suggests, the RDI request is a request by the client device 202 for the operations center 104 to issue an RDI. In one case, the RDI request can specify a start time at which the recording device 210 started recording the resource, and an end time at which the recording device 210 finished recording the resource. The RDI request also includes other parameters, such as service ID information. The service ID information identifies a service that is associated with the resource. AV keys are associated with different respective services. In one exemplary case, for instance, a service refers to a channel through which the client device obtained the resource. Service ID information may be expressed as a GUID or some other kind of identification code. The RDI-issuing module 224 is also made aware of the specific client device that is making the RDI request.

Operation (4). In a fourth operation, the RDI-issuing module 224 generates an RDI for the recorded content and forwards the RDI to the client device 202. More specifically, in one exemplary implementation, to perform this task, the RDI-issuing module 224 can fetch AV keys that are used to protect to the resource for the appropriate period of time and service ID specified in the RDI request. The RDI-issuing module 224 can then encrypt the AV keys and associated key IDs with a server session key (SSK). The RDI-issuing module 224 can then serialize the RDI and sign the RDI with the SSK.

More specifically, according to one exemplary and non-limiting implementation, the RDI produced by the RDI-issuing module 224 can include the following information:

Exemplary Composition of the Recording Definition Information (RDI)

- Version Information. This part of the RDI identifies a version of the RDI.
- Various Flags. This part of the RDI can include one or more flags. For instance, one flag may identify whether an expiration time field (defined below) is valid. Different applications can adopt different flags to suit the needs of a specific technical environment.
- Service ID Information. This part of the RDI includes ID information that describes the service associated with the resource that is to be decrypted. In one exemplary case, service ID information can be expressed as a GUID that describes a channel associated with the resource.
- Recording ID Information. This part of the RDI identifies a specific recording of the resource. Note that it is possible to record the same channel (associated with service ID information) multiple times, with respective different recording IDs associated with the recordings. In one exemplary case, recording if) information can be expressed as a GUID.
- AV Keys and Accompanying Key IDs. This part of the RDI contains the AV keys and associated key ID information that are used to protect the AV content of the resource. This information is encrypted by server session key(s) (SSKs).
- Server Session Key (SSK). This part of the RDI contains the server session key(s) that are used to encrypt the AV keys, the key IDs, and also to sign the RDB. The server session keys are symmetric keys generated on the server side. The SSK information, in turn, can be encrypted by one or more server public keys.
- Rights Management Policy Information. This optional part of the RDI specifies one or more rights management policies that apply to the RDI.
- Start Time. This part of the RDI specifies a time at which the recording device 210 started recording the resource. In one exemplary case, the start time can be specified in NTP format.
- End Time. This part of the RDI specifies a time at which the recording device 210 finished recording the resource. In one exemplary case, the end time can be specified in NTP format.
- Signature Information. This part of the RDI includes a signature of the RDI, which may be produced by signing the RDI with the SSK.
- The RDI can also embed information that identifies the client device for which the RDI was generated, e.g., as part of the Rights Management Policy Information.

Operation (5). In a fifth operation, the client device 202 can receive the generated RDI. In one exemplary case, the recording device 210 can store the RDI in the rights store 214. In a variation of this operation, the system 200 can generate and store RDIs for respective parts of a single resource, rather than storing a single RDI that corresponds to the resource as a whole. This approach may be advantageous to mitigate problems caused by a disruption in recording. That is, by storing multiple RDIs corresponding to different parts of the resource, a disruption in recording may not require recording the entire resource again. Rather, the system 200 can selectively record (and obtain RDIs for) those parts that have yet to be successfully processed.

Operation (6). In a sixth operation, any one of the client devices that is authorized to play back the recorded resource can initiate a request to play back the resource. For instance, the client device 202 which initiated the recording can be the client device which asks to play back the resource. However, for the purposes of illustration, and to maintain consistency with the scenario shown in FIG. 1, FIG. 2 shows that the client device 102 is the client device which asks to play back the resource.

At this point, the processing proceeds in the manner described above with respect to the system 100 of FIG. 1. To begin with, the client device retrieves the previously stored RDI from the rights store 214 and sends the RDI to the transcription module 226.

The above-described scenarios correspond mainly to the case in which the client device 102 seeks to play back a resource that has been completely recorded in its entirety by the client device 202. Any length of time can separate the end of recording from the time of playback. In another case, a user may initiate a pause instruction during the recording of a resource. This prompts the recording device 210 to store resource content in a pause buffer. The user may then later return to viewing the resource, either at the client device 202 at which the pause instruction was issued or at another client device within the household (or elsewhere). In this case, the RDI can be associated with resource content stored in the pause buffer. In yet another case, the RDI protection protocol can be used to administer playback rights at the same time that a resource is being recorded by the recording device 210.

Operation (7). In a seventh operation, the transcription module 226 converts (or "transcribes") the RDI to client targeted information (CTI). This transcription operation can involve several operations. For instance, the transcription module 226 can decrypt the server session key information (SSK) identified in the RDI. The transcription module 226, in conjunction with the validation module 228, can then validate the rights of the client device 102 to consume the content. The validation module 228 can make validation decisions by making reference to one or more applicable policies. The transcription module 226 can also decrypt the AV keys using the SSK.

As a final step, the transcription module 226 can generate and output the CTI. According to one exemplary and non-limiting implementation, the transaction module 226 can create a CTI which has the following exemplary parts:

Exemplary Composition of the Client Targeted Information (CTI)

- Version Information. This part of the CTI identifies the version of the CTI.
- Various Flags. This part of the CTI conveys various implementation-specific flags.
- AV Keys and Accompanying Key IDs. This part of the CTI includes the AV keys and associated key IDs. This information is encrypted by a client-specific AV session key.
- Expiration Time Information. This part of the CTI identifies how long the CTI can be used to consume the resource. When the expiration time is reached, the CTI becomes disabled and cannot be used to consume the resource.
- Signature Information. This part of the CTI identifies a signature of the CTI. In one exemplary case, the client-specific AV session key can be used to sign the CTI.

Operation (8). In an eighth operation, some aspect of the client-side equipment can store the CTI. For instance, the recording device 210 can store the CTI in the rights store 214, which may correspond to the hard disk of the recording device 210. Thereafter, any authorized client device can use the CTI to decrypt and play back the resource. For instance, FIG. 2 shows that the client device 102 uses the CTI to play back the recorded resource. In other cases, depending on the policy applied when generating the CTI, the transcription module 226 may have generated multiple CTIs that allow any client device within a household to retrieve an associated CTI and play back the resource using this CTI. In this scenario, the client device 204 could access an appropriate CTI stored on the record device 210's hard drive and use it to play back the resource.

In summary, again note that the system 200 has the potential advantage that the rights management functionality 218 need not store the keys used to decrypt the resources. This is because this storage task is effectively relegated to the RDIs, which are maintained, in distributed fashion, at the client device level. At the same time, the client devices cannot use the key information embedded in the RDIs without the assistance of the transcription module 226. The above-described solution avoids scaling problems that might result by tasking the rights management functionality 218 to store and manage key information.

According to another advantage, the rights management functionality 218 provides a framework which allows many different rights management policies to be applied to different usage scenarios in an efficient manner. The efficiency of the framework ensues, in part, from the fact that the basic flow of RDI and CTI information is independent of the rules used to grant client devices lights to consume resources. This allows policies to be introduced and changed without performing potentially complex and costly reengineering of the rights management system 200.

According to another advantage, asymmetric security operations are relegated to the operations center 104, rather than the client devices (102, 202, 204, 206). This allows these operations to be performed more quickly.

Those skilled in the art will recognize yet other advantages of the system 200 described above.

Figure 3:
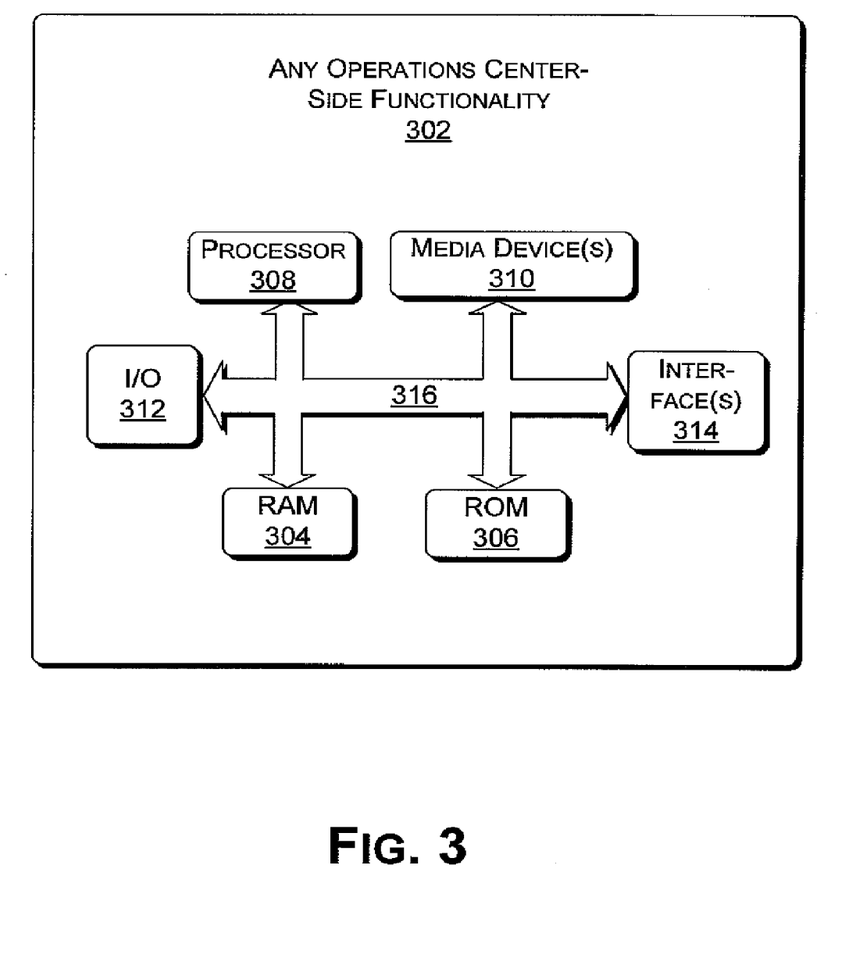
FIG. 3 shows exemplary server-side equipment that can be used in the environment of FIG. 2.

A.3. Operations Center-Side Processing Functionally (FIG. 3)

Various components of the operations center 104 of FIGS. 1 and 2 can be implemented by one or more server computers. FIG. 3 shows a general depiction of processing functionality 302 that can be used to implement any of these processing functions. The processing functionality 302 can include various volatile and non-volatile memory, such as RAM 304 and ROM 306, as well as one or processing devices 308. The memory (304, 306) can store instructions which perform the various rights management functions described above when executed by the processing devices 308. The processing functionality 302 also optionally includes various media devices 310, such a module for reading and writing to a hard disk, an optical disk module, and so forth. The processing functionality 302 also includes an input/output module 312 for receiving various inputs from the user (as implemented by a key input mechanism, etc.), and for providing various outputs to the user (as implemented by various display devices, printers, audio output devices, etc.). The processing functionality 302 can also include one or more interfaces 314 for exchanging data with other devices. One or more buses 316 can communicatively couple the above-described components together. In various applications, the processing functionality 302 shown in FIG. 3 can include additional modules or can omit one or more of the modules shown in FIG. 3.

Figure 5:
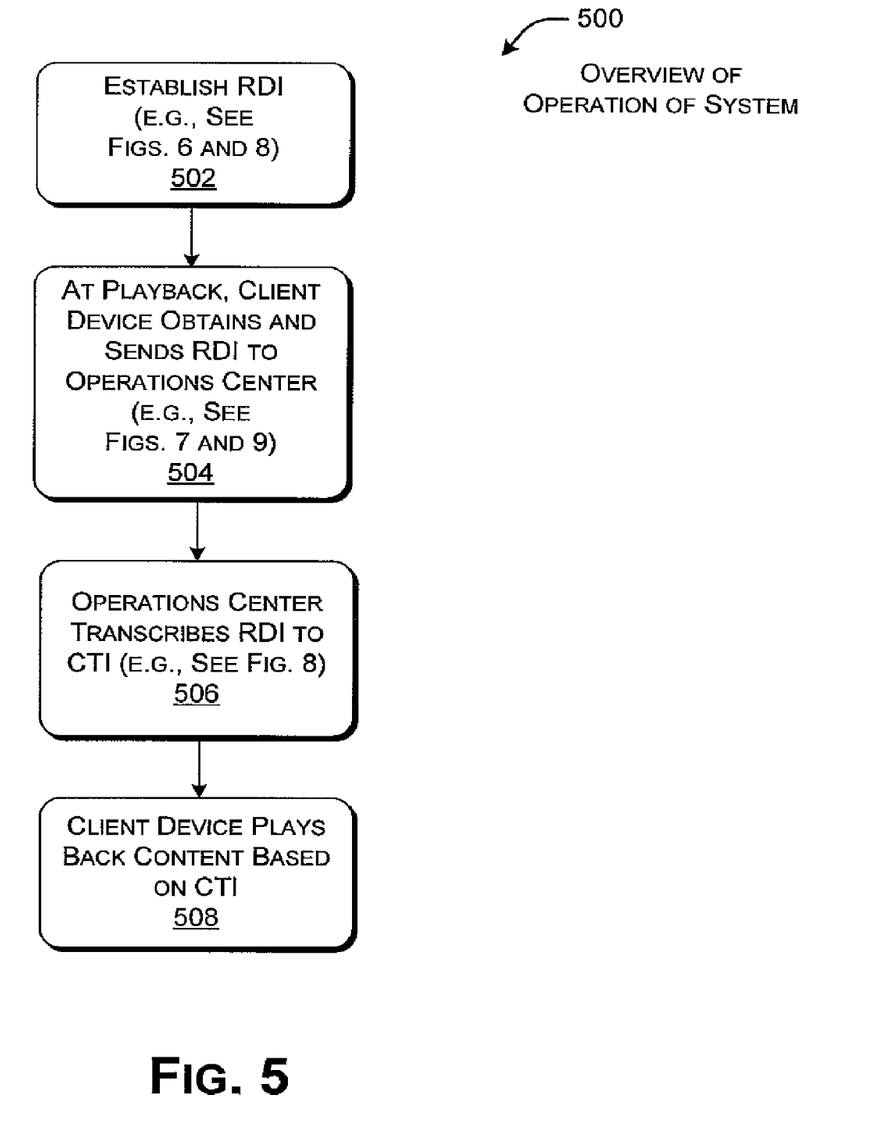
FIG. 5 shows an exemplary procedure which sets forth an overview of the operation of the system of FIG. 1.

A.4. Exemplary Client-Side Processing Equipment (FIG. 5)

Figure 4:
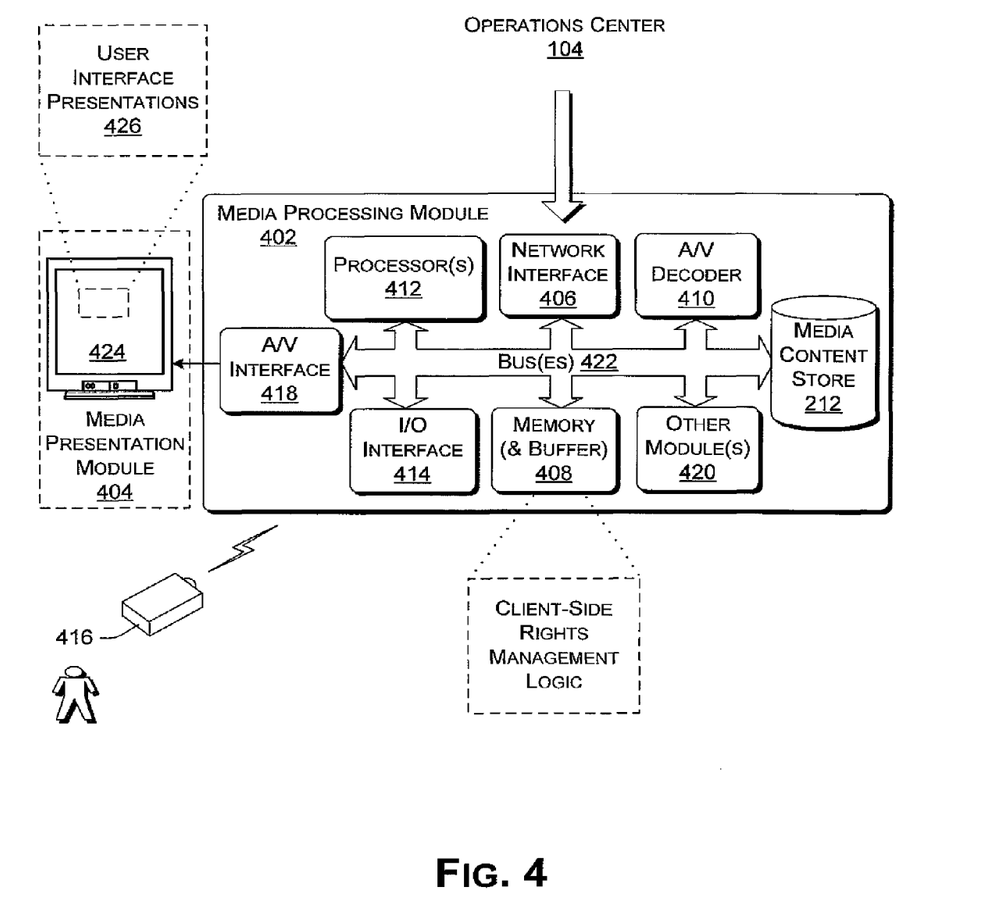
FIG. 4 shows exemplary client-side equipment that can be used in the environment of FIG. 2.

FIG. 4 provides additional details regarding any one of the representative client devices (102, 202, 204, 206) shown in FIG. 1 or FIG. 2. In general, a client device can include a media processing module 402 and a media presentation module 404. The role of the media processing module 402 is to perform various processing operations on a received media resource. The role of the media presentation module 404 is to present the processed media resource.

The media processing module 402 can include a number of modules for performing its ascribed tasks. To begin with, the media processing module 402 includes a network interface module 406. The network interface module 406 can represent any functionality for receiving media information from the operations center 104 using any coupling mechanism. For example, the network interface module 406 can comprise an Ethernet NIC, a DSL modem, a cable modem; a wireless network interface, or other kind of network interface equipment. The media processing module 402 also includes memory 408. A portion of the memory 408 can optionally comprise program instructions for implementing any aspect of client-side rights processing. The media processing module 402 also includes an audio-visual (AV) decoder 410 for decoding (and decompressing) the received media resource into its video and audio components. Decoding comprises ordering packets (if received out of order), extracting media information from the stream of received packets, and also extracting timing information that will govern the playback of the media resource. The media processing module 402 also includes one or more processors 412 for executing instructions to implement the functionality of the media processing module 402. The media processing module 402 also includes an I/O interface 414 for interacting with the user via one or more input devices, such as a remote controller 416, a personal computer (not shown), a joy stick (not shown), a voice recognition mechanism (not shown), and so forth. The media processing module 402 also includes an A/V interface module 418 for providing media information in an appropriate format to the media presentation module 404. The media processing module 402 can also include the above-identified media content store 212 for storing recorded resources and other data. More specifically, this media content store 212 can be integrated with the media processing module 402 itself, or can represent a part of the recording device 210, with which the media processing module 402 interacts. Finally, the client processing module 402 can include various other modules 420, not specifically identified by name in the figure. For instance, the media processing module 402 can include a graphics compositor for combining a video component of the media information from the AV decoder 410 on a frame-by-frame basis with graphics information. The graphics information may comprise various user interface presentations which are overlaid on the media information. One or more busses 422 communicatively couple the above-identified components together.

The media presentation module 404 can comprise any kind of device for presenting AV information, including a CRT-type device, an LCD-type device, and so forth. In any case, the media presentation device 404 defines a display surface 424. The media processing module 402 can present one or more user interface presentations 426 on the display surface 404.

B. Exemplary Method of Operation (FIGS. 5-9)

FIGS. 5-9 describe the operation of the systems of Section A in flowchart form. To facilitate discussion, certain operations are described as constituting distinct steps performed in a certain order. Such implementations are exemplary and non-limiting. Certain steps described in these flowcharts can be grouped together and performed in a single operation, and certain steps can be performed in an order that differs from the order shown in the flowcharts. As the functions described in these flowcharts have already been explained above in Section A, Section B will serve primarily as a review of those functions.

B.1. Overview of Exemplary System Operation (FIG. 5)

FIG. 5 shows a procedure 500 which represents an overview of the operation of the system 100 shown in FIG. 1 or the more specific system 200 shown in FIG. 2.

In step 502, the systems (100, 200) establish RDI information. As will be set forth with reference to other figures, this operation can comprise sending an RDI request to the operations center 104 after a recording has been completed (or in the course of a recording), and receiving one or more RDIs in response.

In step 504, when a user wishes to play back the resource, an associated client device (such as client device 102) sends the stored RDI to the operations center 104.

In step 506, the operations center 104 transcribes the RDI to a CTI, and then forwards the CTI to the client device 102.

In step 508, the client device 102 decrypts and plays back the resource using the received CTI.

B.2. Exemplary Client Procedure for Establishing RDI (FIG. 6)

Figure 6:
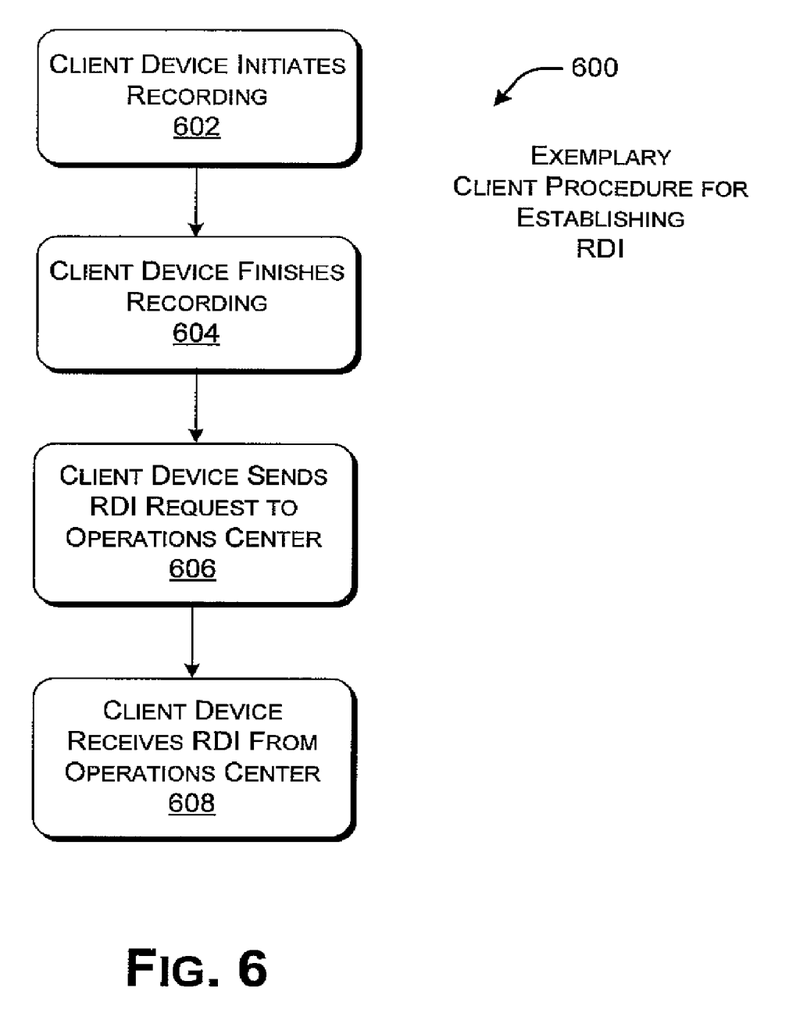
FIG. 6 shows an exemplary procedure which sets forth how a client device, in the environment of FIG. 2, can establish recording definition information (RDI).

FIG. 6 shows a procedure 600 which represents operations performed by a client device, such as client device 202 of FIG. 2, to establish an RDI.

In step 602, the client device 202 initiates the recording of a resource, such as by entering an instruction to record an AV program on a particular channel, and so on.

In step 604, the client device 202 finishes recording the resource or reaches some other juncture which prompts the system 200 to generate an RDI.

In step 606, the client device 202 sends an RDI request to the operations center 104. The purpose of this request is to receive an RDI from the operations center 104.

In step 608, the client device 202 receives an RDI from the RDI-issuing module 224 of the operations center 104.

B.3. Exemplary Client Procedure for Obtaining CTI (FIG. 7)

Figure 7:
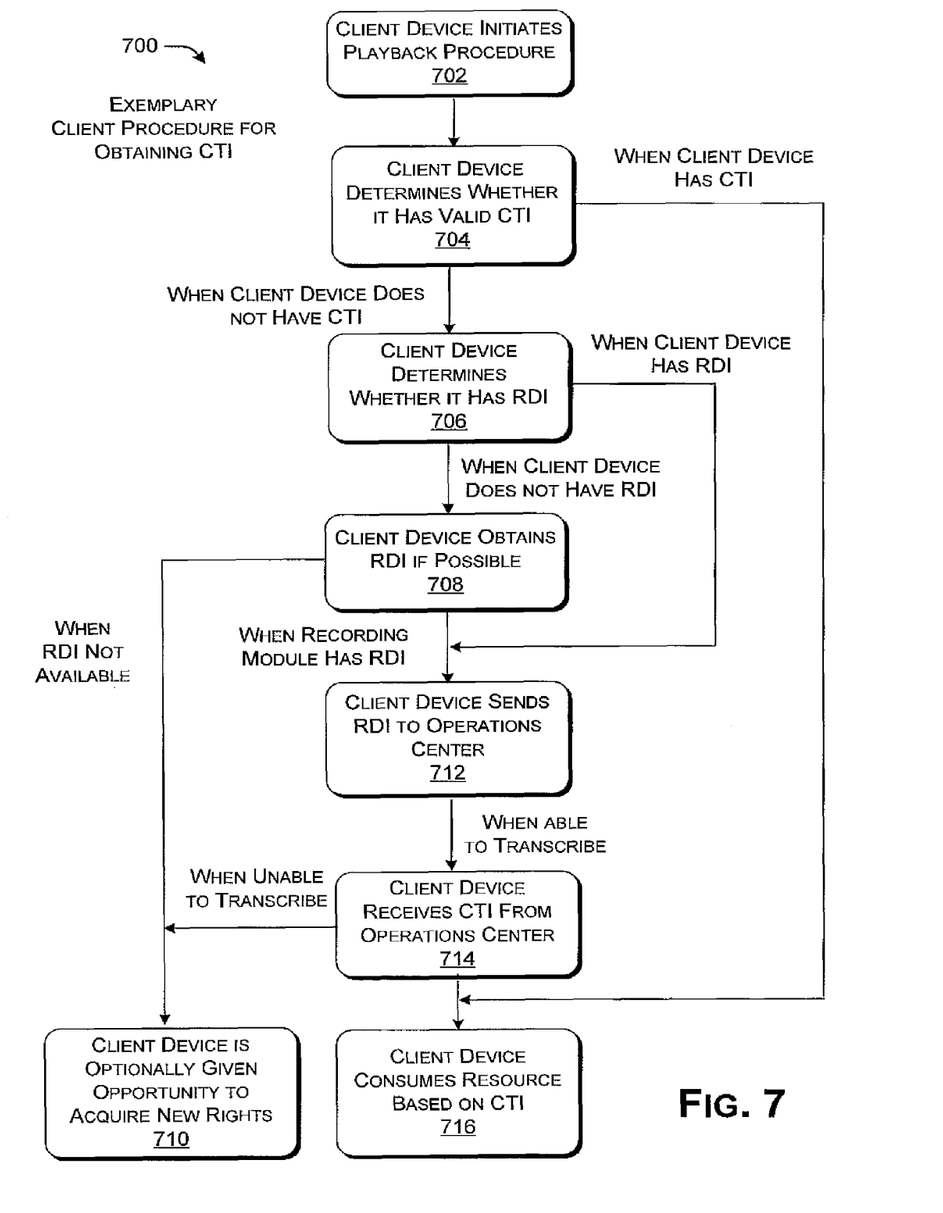
FIG. 7 shows an exemplar procedure which sets forth how a client device, in the environment of FIG. 2, can obtain client targeted information (CTI) based on the RDI.

FIG. 7 shows a procedure 700 which represents an operation used by a client device, such as client device 102 of FIGS. 1 and 2, to obtain a CTI based on a previously received RDI.

In step 702, the client device 102 issues an instruction to play back a previously recorded resource. Or the client device 102 (or some other client device) can issue an instruction to play back a resource from a pause buffer. Or the client device 102 can issue can instruction to play back a resource that is currently being received in live fashion.

In step 704, the client device 102 first determines whether a CTI is currently stored in client-side equipment (e.g., within the hard disk of the recorder device 210) that can be used in playing back an associated resource.

In step 706, if a valid CTI is not currently available, then the client device 102 determines whether an RDI corresponding to the resource currently exists at the client-side equipment.

In step 708, if a valid RDI is available, the client device 102 obtains the RDI from the rights store 214.

In step 710, if a valid RDI is not currently available, then the client device 102 may access the RDI-issuing module 224 of the operations center 104 to obtain a new RDI. In those cases in which the client device 102 does not have a pre-established relationship with the fights management functionality 218, this step (710) may involve setting up an account with the client device 102, selecting a policy which will apply to the client device 102, and obtaining an appropriate license.

In step 712, presuming that a valid RDI can be somehow obtained, the client device 102 forwards the RDI to the transcription module 226 of the operations center 104.

In step 714, the client device 102 receives a CTI corresponding to the submitted RDI from the transcription module 226. In those cases in which the transcription module 226 is unable to generate a CTI (e.g., because the client device 102 is determined to have no rights to consume the resource), then the procedure 700 may again advance to step 710, in which case the client device 102 is potentially given the opportunity to establish new rights or update previous rights, and so on.

In step 716, the client device 102 consumes the resource based on the CTI that it has received from the operations center 104. That is, the CTI can be used to decrypt the AV content in the resource.

B.4. Exemplary Operations Center Procedure for Establishing RDI (FIG. 8)

Figure 8:
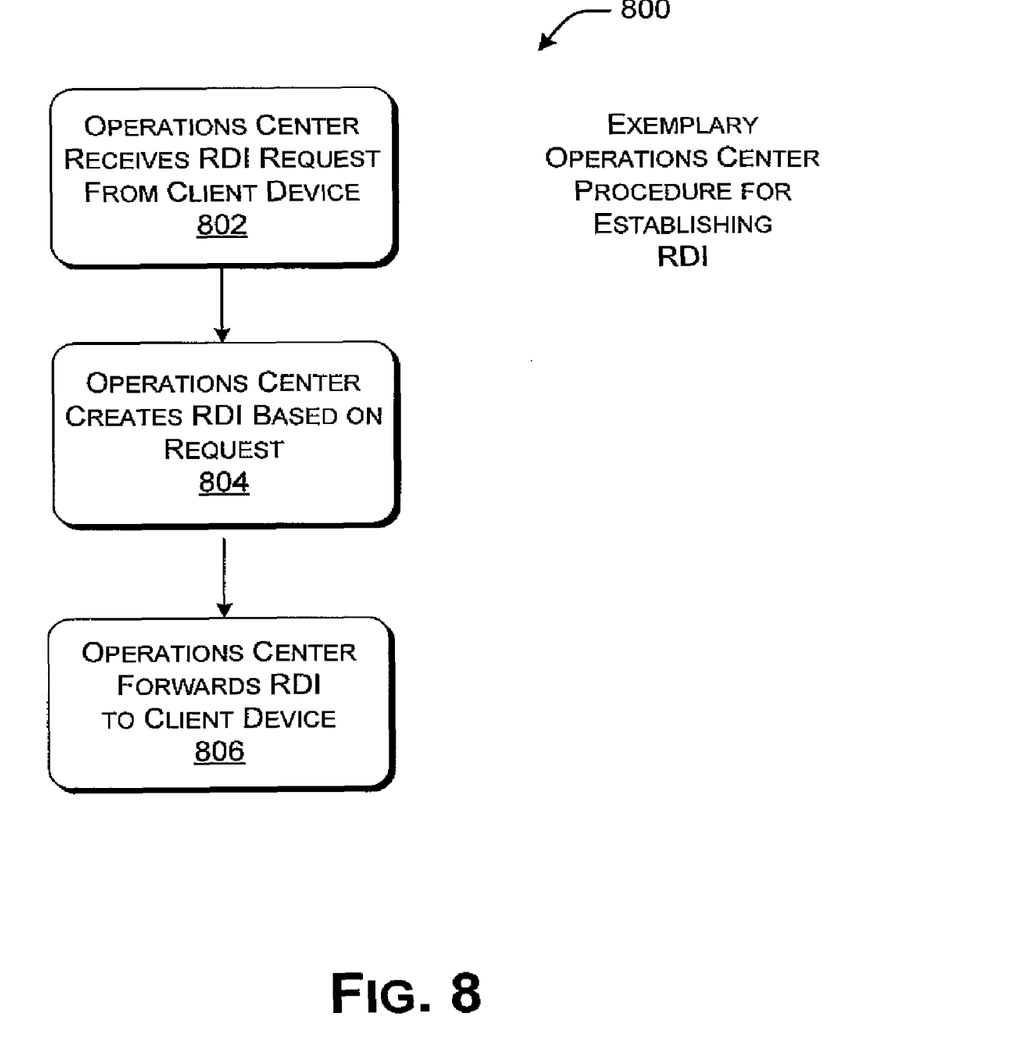
FIG. 8 shows an exemplary procedure which sets forth how an operations center, in the environment of FIG. 2, can provide the RDI in response to a request from the client device (wherein this figure complements the client-side procedure of FIG. 6).

FIG. 8 shows a procedure 800 which represents an operation used by the operations center 104 to establish an RDI when requested by a client device, such as the client device 202. This procedure 800 is the operations center counterpart to the client-side procedure 600 of FIG. 6.

In step 802, the RDI-issuing module 224 of the operations center 104 receives an RDI request by the client device 202 to create an RDI.

In step 804, the RDI-issuing module 224 creates the RDI in the manner described in Section A.

In step 806, the RDI-issuing module 224 forwards the generated RDI to the client device 202.

B.5. Exemplary Operations Center Procedure for Transcribing RDI (FIG. 9)

Figure 9:
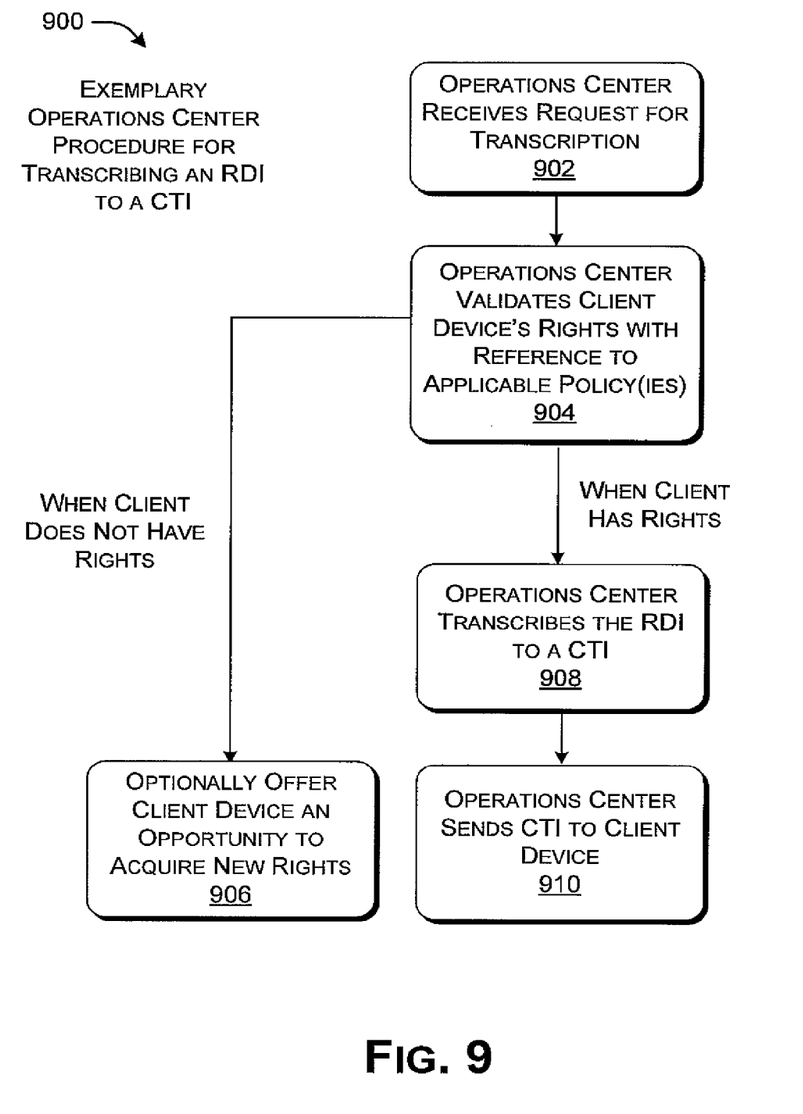
FIG. 9 shows an exemplary procedure which sets forth how an operations center, in the environment of FIG. 2, can transcribe the RDI to a CTI (wherein this figure complements the client-side procedure of FIG. 8).

FIG. 9 shows a procedure 900 which represents an operation used by the transcription module 226 of the operations center 104 to generate a CTI based on an RDI forwarded by a client device, such as the client device 102 of FIGS. 1 and 2. This procedure 900 defines an operations center counterpart to the client-side procedure 700 of FIG. 7.

In step 902, the transcription module 226 receives a request from the client device 102 to convert an RDI into a CTI.

In step 904, the transcription module 226 in conjunction with the validation module 228 validates the client device 102's rights to consume the resource with reference to one or more policies.

In step 906, if it is determined that the client device 102 does not currently have rights to consume the resource, then the client device 102 may optionally be given an opportunity to acquire such rights, e.g., by purchasing a license or entering into some other contractual relationship with the rights management functionality 218.

In step 908, if the client device 102 is validated to receive a CTI, the transcription module 226 transcribes the received RDI into a CTI using the procedure described in Section A.

In step 910, the transcription module 226 sends the CTI to the client device 102, where the CTI can be used to decrypt and consume the resource.

In closing, a number of features were described herein by first identifying exemplary problems that these features can address. This manner of explication does not constitute an admission that others have appreciated and/or articulated the problems in the manner specified herein. Appreciation and articulation of the problems present in the relevant art(s) is to be understood as part of the present invention. Further, identification of one or more needs in the relevant art(s) does not suggest that the subject matter described herein is limited to solving these needs; the subject matter may address additional needs.

Further, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for administering rights to consume a resource, comprising:

receiving, from a first client device, following recording of the resource by the first client device, a recording definition information (RDI) request, the RDI request comprising a recording start time, a recording end time, and service identification information identifying a channel associated with the resource, wherein the first client device is one of multiple affiliated client devices configured to access a content store in which the recorded resource is stored;

generating the RDI for the resource in response to the request by fetching a resource key for the resource, wherein the RDI comprises a resource key that is required by the client devices to consume the recorded resource, wherein the resource key is encrypted by a session key to prevent client use of the resource key;

sending the RDI to the first client device, wherein the RDI is stored in a rights store accessible by the multiple client devices;

receiving the RDI from a second client device of the multiple client devices that wishes to consume the resource;

transcribing the RDI to client targeted information (CTI), wherein the transcribing comprises using information in the RDI to recover the resource key that can be used to consume the resource at the second client device, wherein the CTI comprises the resource key encrypted by a client-specific key for the second client device to use the resource key to consume the resource;

forwarding the CTI to the second client device for the second client device to use the CTI to consume the resource; and in response to receiving the RDI from the second client device, generating multiple CTIs and forwarding the multiple CTIs to the second client device for storage in the rights store, wherein the multiple CTIs allow the multiple affiliated client devices to consume the resource.

2. The method of claim 1, wherein the receiving, transcribing, and forwarding are performed by an operations center, and wherein the operations center, prior to receiving the RDI, does not store the keys that can be used to consume the resource at the client device.

3. The method of claim 1, wherein the CTI includes expiration information that defines an amount of time that the CTI can be used to consume the resource by the second client device.

4. The method of claim 1, wherein the first client device uses one of the multiple CTIs corresponding to the first client device obtained by the second client device to consume the resource.

5. The method of claim 1, wherein the transcribing comprises determining whether the second client device has rights to consume the resource by consulting rights-related rules which set forth a policy regarding the second client device's consumption of the resource.

6. One or more machine-readable media containing machine-readable instructions for implementing the method of claim 1.

7. A method comprising:

receiving a resource by a client device, wherein the client device stores a recording of the resource in a content store;

sending, to an operations center, a recording definition information (RDI) request comprising information identifying the resource recorded by the client device;

receiving, by the client device, the RDI for the resource in response to the request, the RDI received from the operations center comprising a first key that is required by the client device to consume the recorded resource, the first key being encrypted by a second key to prevent client use of the first key;

receiving an instruction to consume the recorded resource by the client device;

forwarding the RDI to the operations center in response to receiving the instruction to consume the recorded resource;

receiving, by the client device, from the operations center in response to the forwarded RDI, client targeted information (CTI), wherein the CTI contains the first key no longer encrypted by the second key; and using the CTI received from the operations center to consume the resource at the client device; and wherein the client device is a first client device from among plural affiliated client devices, and wherein, in response to receiving the RDI from the first client device, multiple CTIs are generated and forwarded to the first client device for storage in a rights store, wherein the multiple CTIs allow the plural affiliated client devices to consume the resource.

8. The method of claim 7, wherein the client device stores the RDI and the CTI received from the operations center in a store of a client-side recording device.

9. The method of claim 7, further comprising locally storing the RDI for later access by other affiliated client devices.

10. The method of claim 7, wherein the client device is a first client device from among plural affiliated client devices, and wherein a second one of the affiliated client devices receives an instruction to consume the recorded resource, wherein the second client device retrieves the RDI obtained by the first client device and sends the RDI to the operations center for obtaining another CTI.

11. The method of claim 7, wherein the operations center, prior to receiving the RDI, does not store the first key that can be used to consume the resource at the client device.

12. The method of claim 7, wherein the CTI includes expiration information that defines an amount of time that the CTI can be used to consume the resource by the client device.

13. One or more machine-readable media containing machine-readable instructions for implementing the method of claim 7.

14. Rights management functionality implemented on one or more servers for administering rights to consume a resource, comprising:

a recording definition information (RDI) issuing module configured to issue recording definition information (RDI) after a resource has been recorded by a client-side recording device in response to receiving a request for the RDI from a client device identifying the recorded resource, wherein the RDI comprises a first key that is required by the client device to consume the recorded resource, wherein the first key is encrypted by a second key to prevent client use of the first key; and a transcription module configured to:

receive the RDI from a client device that wishes to consume the resource;

convert the RDI into client targeted information (CTI) by decrypting the first key from the RDI so that the first key can be used by the client device to consume the resource;

forward the CTI to the client device; and in response to receiving the RDI from the client device, multiple CTIs are generated and forwarded to the client device, wherein the multiple CTIs allow the multiple affiliated client devices to consume the recorded resource.

15. The rights management functionality of claim 14, wherein the CTI includes expiration information that defines an amount of time that the CTI can be used to consume the resource by the client device.

16. The rights management functionality of claim 14, wherein the request for the RDI is received from a first client device that recorded the resource, wherein the RDI is received from a second client device wishing to consume the recorded resource.

17. The rights management functionality of claim 14, wherein issuing the RDI includes fetching the first key that enables the client device to consume the recorded resource, wherein fetching the first key is based on the identifying of the recorded resource in the request for the RDI.

18. The method of claim 7, wherein in response to a request to receive the resource the client device receives the resource as well as key information allowing the client device to consume the resource in a live mode, wherein following consumption of the resource in the live mode, the client device uses the CTI to consume the recording of the resource.

* * * * *